United States Patent
Wang et al.

(10) Patent No.: US 10,150,113 B2
(45) Date of Patent: *Dec. 11, 2018

(54) POLYMER AND METHOD FOR PREPARING THE SAME

(71) Applicant: INDUSTRIAL TECHNOLOGY RESEARCH INSTITUTE, Hsinchu (TW)

(72) Inventors: Chiu-Tung Wang, Tianwei Township (TW); Li-Duan Tsai, Hsinchu (TW); Cheng-Hsiu Tsai, Hsinchu (TW); Chiu-Hun Su, Hsinchu (TW); Ming-Chou Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,851

(22) Filed: Apr. 22, 2016

(65) Prior Publication Data
US 2017/0182487 A1  Jun. 29, 2017

(30) Foreign Application Priority Data
Dec. 28, 2015 (TW) .............................. 104143989 A

(51) Int. Cl.
*C08F 32/08* (2006.01)
*C08G 65/48* (2006.01)
(Continued)

(52) U.S. Cl.
CPC .............. *B01J 41/14* (2013.01); *B01D 71/82* (2013.01); *C08F 232/04* (2013.01); *C08G 61/08* (2013.01);
(Continued)

(58) Field of Classification Search
USPC .......................................... 526/280; 429/492
See application file for complete search history.

(56) References Cited

U.S. PATENT DOCUMENTS

| 7,785,726 B2 | 8/2010 | Yoshida et al. |
| 8,223,472 B1 | 7/2012 | Dirk et al. |

(Continued)

FOREIGN PATENT DOCUMENTS

| CN | 102049202 A | 5/2011 |
| CN | 102695741 A | 9/2012 |

(Continued)

OTHER PUBLICATIONS

Wiesenauer et al., "Synthesis and Ordered Phase Separation of Imidazolium-Based Alkyl-Ionic Diblock Copolymers Made via ROMP", Macromolecules, vol. 44, pp. 5075-5078 (2011).*
(Continued)

*Primary Examiner* — Mark Kaucher
*Assistant Examiner* — Henry Hu
(74) *Attorney, Agent, or Firm* — Birch, Stewart, Kolasch & Birch, LLP

(57) ABSTRACT

A polymer and a method for preparing the same are provided. The polymer includes a first repeat unit and a second repeat unit. In particular, the first repeat unit is

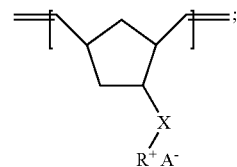

and, the second repeat unit is

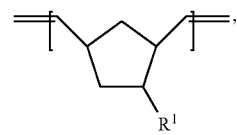

wherein $R^+$ is

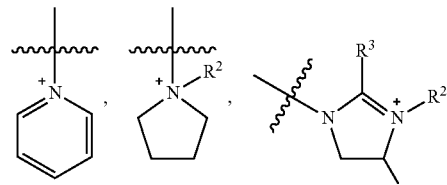

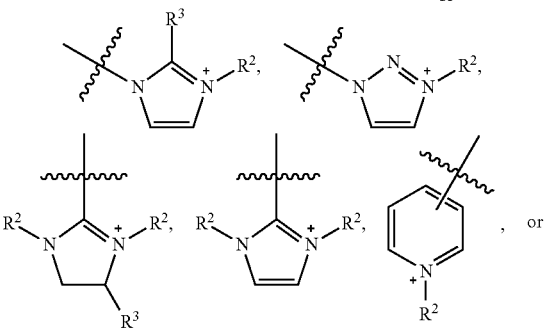

, or (Continued)

-continued

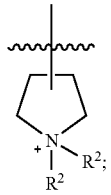

$A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is

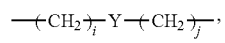

i and j are independently 0, or an integer from 1 to 4; Y is —O—, —S—, —CH$_2$—, or —NH—; $R^1$ is independently $C_{1-8}$ alkyl group; and, $R^2$ and $R^3$ are hydrogen, or independently $C_{1-8}$ alkyl group.

18 Claims, No Drawings

(51) Int. Cl.
| | |
|---|---|
| B01J 41/14 | (2006.01) |
| C08F 232/04 | (2006.01) |
| B01D 71/82 | (2006.01) |
| C08J 5/22 | (2006.01) |
| C08G 61/08 | (2006.01) |
| H01M 8/083 | (2016.01) |
| H01M 8/1023 | (2016.01) |
| B01D 71/44 | (2006.01) |

(52) U.S. Cl.
CPC ............ *C08J 5/2256* (2013.01); *H01M 8/083* (2013.01); *H01M 8/1023* (2013.01); *B01D 71/44* (2013.01); *B01D 2325/16* (2013.01); *B01D 2325/42* (2013.01); *C08G 2261/122* (2013.01); *C08G 2261/135* (2013.01); *C08G 2261/149* (2013.01); *C08G 2261/1412* (2013.01); *C08G 2261/3324* (2013.01); *C08G 2261/418* (2013.01); *C08G 2261/516* (2013.01); *C08G 2261/76* (2013.01); *C08J 2365/00* (2013.01)

(56) References Cited

U.S. PATENT DOCUMENTS

| | | | |
|---|---|---|---|
| 8,241,770 B2 | 8/2012 | Yoshida et al. | |
| 8,765,893 B2* | 7/2014 | Bell .................... | B01D 71/44 429/492 |
| 8,765,894 B2 | 7/2014 | Bell et al. | |
| 9,169,361 B1 | 10/2015 | Aamer | |
| 9,745,433 B2* | 8/2017 | Tsai .................... | C08J 5/2256 |
| 2006/0223895 A1 | 10/2006 | Yoshida et al. | |
| 2010/0297529 A1 | 11/2010 | Yoshida et al. | |
| 2011/0244368 A1 | 10/2011 | Bell et al. | |
| 2012/0157579 A1* | 6/2012 | Parent .................... | A01N 25/10 524/35 |
| 2015/0228950 A1 | 8/2015 | Moon et al. | |

FOREIGN PATENT DOCUMENTS

| | | |
|---|---|---|
| CN | 104693423 A | 6/2015 |
| CN | 105131256 A | 12/2015 |
| DE | 100 06 694 A1 | 8/2001 |
| EP | 2270104 A1 | 1/2011 |
| JP | 2009-256654 A | 11/2009 |
| JP | 2013-513705 A | 4/2013 |
| JP | WO2015/093601 A1 | 6/2015 |
| JP | 2017-119269 A | 7/2017 |
| TW | 200725971 A | 7/2007 |
| WO | WO 2011/072304 A2 | 6/2011 |

OTHER PUBLICATIONS

Nguyen et al., "Effect of composition and nanostructure on CO2/N2 transport properties of supported alkyl-imidazolium block copolymer membranes", J. Membrane Science, vol. 430, pp. 312-320 (2013).*
Autenrieth et al., "Reactivity of the Dicationic Ruthenium-Alkylidene Complex [Ru(DMF)3(IMesH2)(=CH-2-(2-PrO)-C6H4)], 2+(BF4-)2] in Ring-Opening Metathesis and Cyclopolymerization", Macromolecular Chemistry and Physics, 2013, vol. 214, pp. 33-40.
Biondi et al., "Synthesis of Gold Nanoparticle Catalysts Based on a New Water-Soluble Ionic Polymer", Inorganic Chemistry, 2011, vol. 50, pp. 8038-8045.
Nguyen et al., "Effect of composition and nanostructure on CO2/N2 transport properties of supported alkyl-imidazolium block copolymer membranes", Journal of Membrane Science, vol. 430, 2013, pp. 312-320.
Wiesenauer et al., "Synthesis and Ordered Phase Separation of Imidazolium-Based Alkyl-Ionic Diblock Copolymers Made via ROMP", Macromolecules, 2011, vol. 44, pp. 5075-5078.
Ye et al., "Grafting poly(ionic liquid) brushes for anti-bacterial and anti-biofouling applications", Journal of Materials Chemistry, 2012, vol. 22, pp. 13123-13131.
Extended European Search Report for European Application No. 16172017.2, dated Jul. 25, 2016.
Robertson et al., "Tunable High Performance Cross-Linked Alkaline Anion Exchange Membranes for Fuel Cell Applications," Journal of the American Chemical Society, vol. 132, No. 10, Mar. 17, 2010 (Published on Web Feb. 23, 2010), pp. 3400-3404, XP002638474.
Vygodskii et al., "Conductive Polymer Electrolytes Derived from Poly(norbornene)s with Pendant Ionic Imidazolium Moieties," Macromolecular Chemistry and Physics, vol. 209, No. 1, Jan. 4, 2008, pp. 40-51, XP055288146.
Wiesenauer et al., "Imidazolium-containing, hydrophobic-ionic-hydrophilic ABC triblock copolymers: synthesis, ordered phase-separation, and supported membrane fabrication," Soft Matter, vol. 9, No. 33, Jul. 18, 2013, pp. 7923-7927, XP055288143.
Taiwanese Office Action and Search Report for Taiwanese Application No. 104143989, dated Jul. 22, 2016.
Clark et al., A Ring-Opening Metathesis Polymerization Route to Alkaline Anion Exchange Membranes: Development of Hydroxide-Conducting Thin Films from an Ammonium-Functionalized Monomer, J. of the American Chemical Society, Aug. 21, 2009, V131 N36, p. 12888-12889.
Japanese Office Action dated Oct. 17, 2017 for JP Application No. 2016-176356 with English Translation.
Chinese Office Action and Search Report, dated Aug. 27, 2018, for Chinese Application No. 201610078291.5.
Notice of Allowance dated Jul. 3, 2018 for corresponding Japanese Application No. 2016-176356.

* cited by examiner

POLYMER AND METHOD FOR PREPARING THE SAME

CROSS REFERENCE TO RELATED APPLICATIONS

The application is based on, and claims priority from, Taiwan Application Serial Number 104143989, filed on Dec. 28, 2015, the disclosure of which is hereby incorporated by reference herein in its entirety.

TECHNICAL FIELD

The technical field relates to a polymer and a method for preparing the same.

BACKGROUND

Ion exchange membranes are widely used in electrodialysis purification, fuel cells, electroplating, and the food industry.

An ion exchange membrane includes a polymer material having negatively charged groups or positively charged groups serving as the film body, and migratable cations or anions under electrical or chemical potential. A cation exchange membrane has negatively charged groups fixed on the polymer and migratable cations. Identically, an anion exchange membrane has positively charged groups fixed on the polymer and migratable cations. In general, the characteristics of the ion exchange membrane are determined by the number, type, and distribution of the fixed charged group. Anion exchange membranes made of conventional polymer material are not suitable for use in an ion exchange membrane fuel cell, due to the poor solubility, mechanical strength, and solvent selectivity of the conventional polymer material.

SUMMARY

According to an embodiment of the disclosure, the disclosure provides a polymer including a first repeat unit and a second repeat unit, wherein the first repeat unit can be

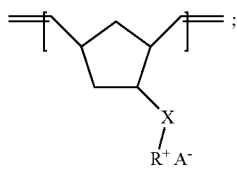

the second repeat unit can be

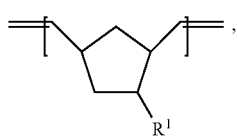

wherein $R^+$ can be

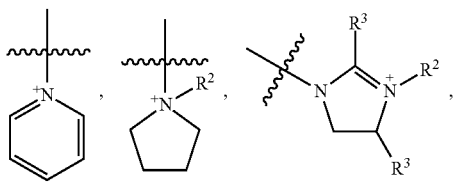

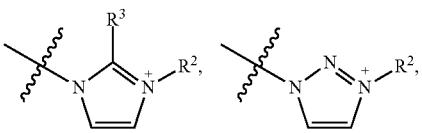

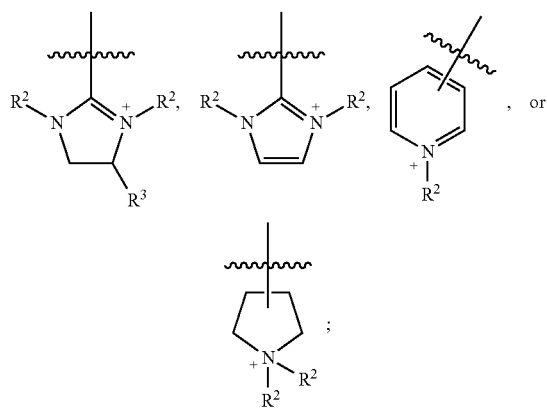

$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X can be

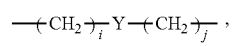

i and j can be independently 0, or an integer from 1 to 6, Y can be —O—, —S—, —CH$_2$—, or —NH—; $R^1$ can be independently $C_{1-8}$ alkyl group; and, $R^2$ and $R^3$ can be independently hydrogen, or $C_{1-8}$ alkyl group.

According to other embodiments of the disclosure, the disclosure provides a method for preparing the aforementioned polymer. The method includes subjecting a composition to a polymerization. In particular, the composition includes a first monomer having a structure of Formula (I) and a second monomer having a structure of Formula (II)

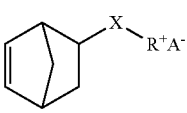

Formula (I)

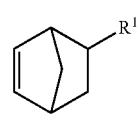

Formula (II)

wherein R+ can be

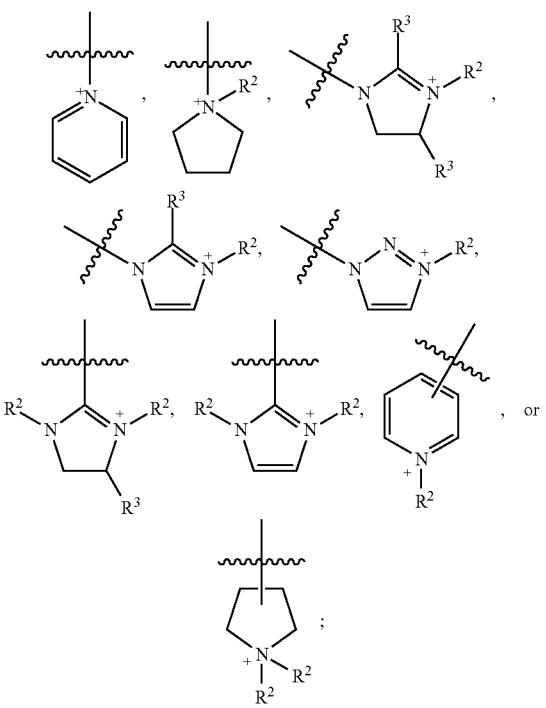

A− can be F−, Cl−, Br−, I−, OH−, HCO$_3^-$, HSO$_4^-$, SbF$_6^-$, BF$_4^-$, H$_2$PO$_4^-$, H$_2$PO$_3^-$, or H$_2$PO$_2^-$; X can be

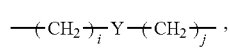

i and j can be independently 0, or an integer from 1 to 6, Y can be —O—, —S—, —CH$_2$—, or —NH—; R$^1$ can be independently C$_{1-8}$ alkyl group; and, R$^2$ and R$^3$ can be independently hydrogen, or C$_{1-8}$ alkyl group.

A detailed description is given in the following embodiments with reference to the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The disclosure provides a polymer and a method for preparing the same. The polymer of the disclosure can be a polymer with a cationic group (such as a highly stable cyclic conjugated cationic group) and non-ionic group (such as long-chain group). In the chemical structure design, in order to enhance the electrical conductivity of the polymer, the polymer of the disclosure has a repeat unit with a cationic group. In addition, the polymer of the disclosure has a repeat unit with a non-ionic group, in order to prevent the solubility of the polymer having cationic groups from decreasing when dissolving in a solvent. According to embodiments of the disclosure, besides the high solubility, the polymer of the disclosure exhibits improved mechanical strength and increased solvent selectivity.

According to an embodiment of the disclosure, the polymer of the disclosure includes a first repeat unit and a second repeat unit. The first repeat unit can be

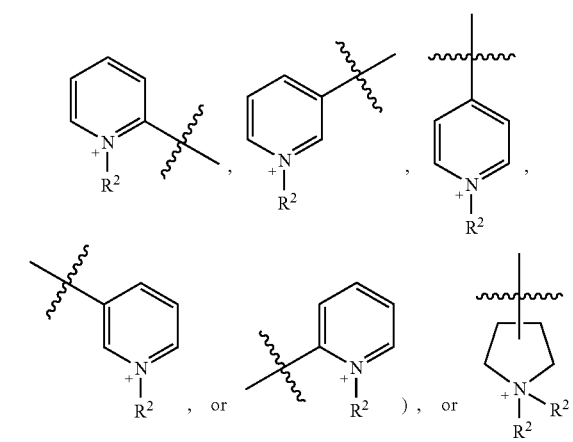

wherein R+ can be (such as:

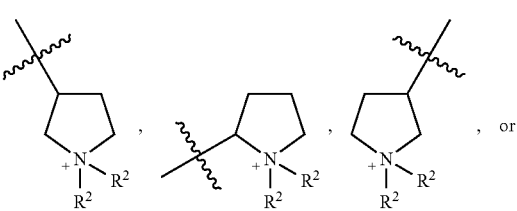

-continued

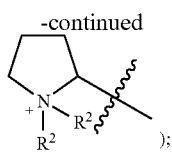

);

$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is

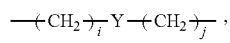

i and j can be independently 0, or an integer from 1 to 6, Y can be —O—, —S—, —CH$_2$—, or —NH—; and, $R^2$ and $R^3$ can be independently hydrogen, or $C_{1-8}$ alkyl group (such as: methyl, ethyl, propyl, isopropyl, n-butyl, sec-butyl, isobutyl, tert-butyl, pentyl, hexyl, cyclohexyl, cyclopentyl, heptyl, or octyl). In addition, the second repeat unit can be

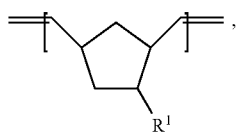

wherein $R^1$ can be independently $C_{1-8}$ alkyl group (such as methyl, ethyl, propyl, isopropyl, n-butyl, sec-butyl, isobutyl, tert-butyl, pentyl, hexyl, cyclohexyl, cyclopentyl, heptyl, or octyl).

According to embodiments of the disclosure, the first repeat unit can be

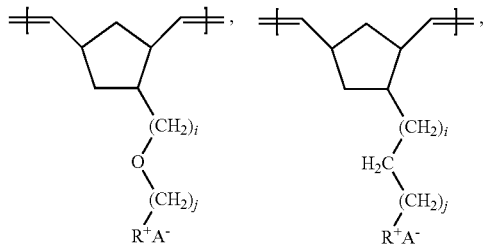

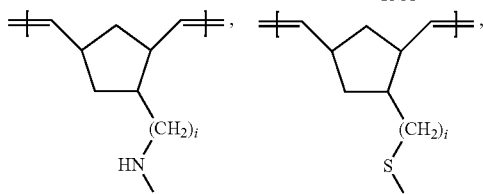

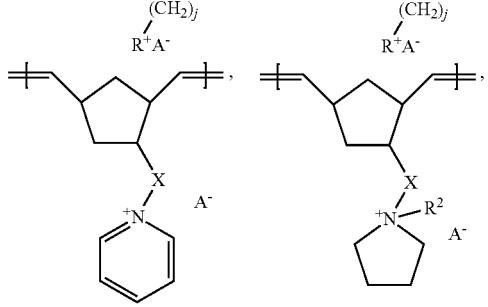

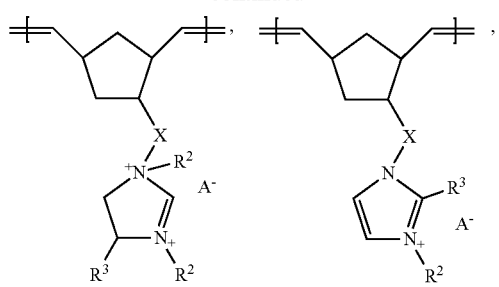

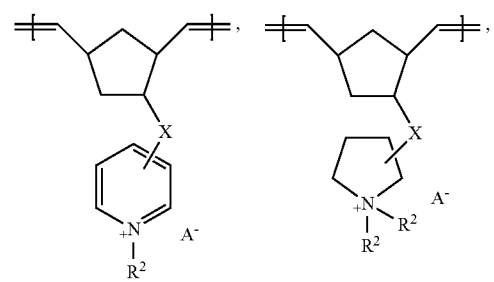

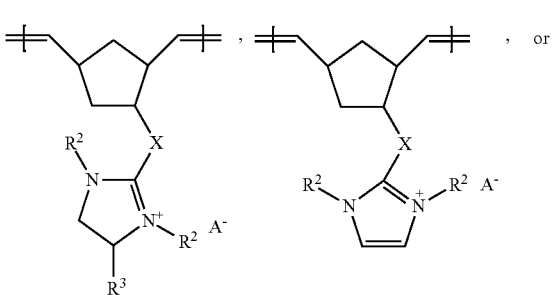

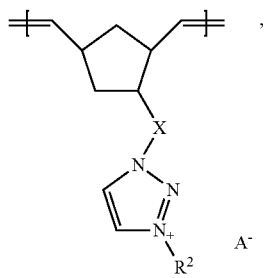

, or wherein $R^+$ can be

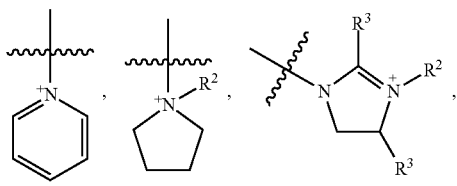

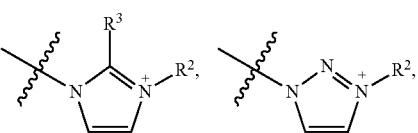

-continued

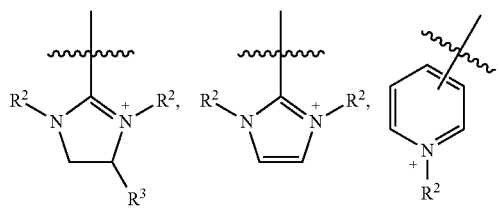

(such as

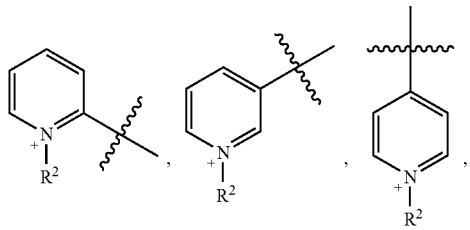

(such as

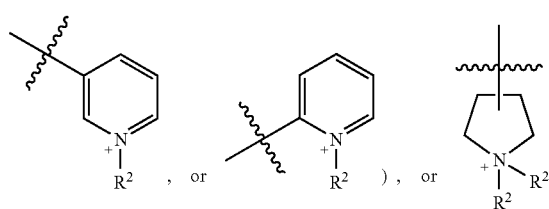

);

A⁻ can be F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂; X is

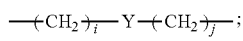

Y can be —O—, —S—, —CH₂—, or —NH—; i and j can be independently 0, or an integer from 1 to 6; and, $R^2$ and $R^3$ can be independently hydrogen, or $C_{1-8}$ alkyl group.

According to embodiments of the disclosure, the polymer of the disclosure has a molecular weight (such as number average molecular weight) between about 100,000 and 250,000.

According to embodiments of the disclosure, the second repeat unit can be

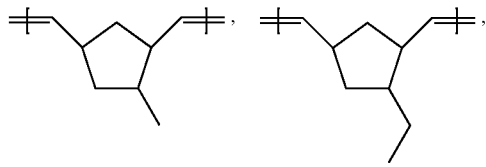

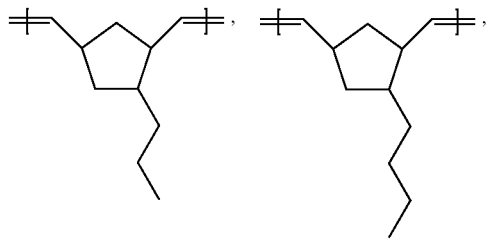

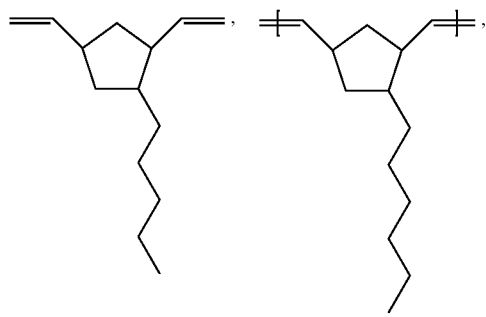

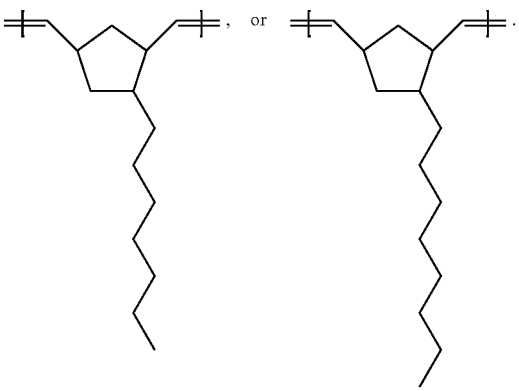

According to embodiments of the disclosure, the ratio between the first repeat unit and the second repeat unit of the polymer can be adjusted to achieve the desired characteristics of the polymer. For example, the ratio between the first repeat unit and the second repeat unit can be increased in order to enhance the electrical conductivity and the anion exchange capacity of the polymer. On the other hand, the ratio between the first repeat unit and the second repeat unit can be decreased in order to enhance the solubility, the mechanical strength, and the solvent selectivity of the polymer. The ratio between the first repeat unit and the second repeat unit can be between about 1:99 and 99:1, such as between about 10:90 and 90:10, between about 20:80 and 80:20, or between about 30:70 and 70:30.

According to embodiments of the disclosure, the polymer of the disclosure can further include a third repeat unit, wherein the third repeat unit can be

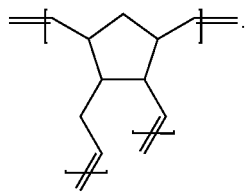

The portion represented by

of the first repeat unit, the second repeat unit, or the third repeat unit is bonded to the portion represented by

of the other first repeat unit, the other second repeat unit, or the other third repeat unit. In addition, the first repeat unit, the second repeat unit, and the third repeat unit can be arranged in a random fashion. For example, the polymer of the disclosure can have a moiety represented by

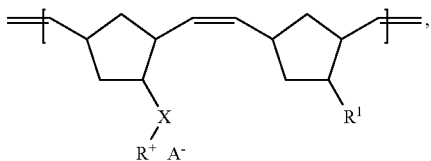

a moiety represented by

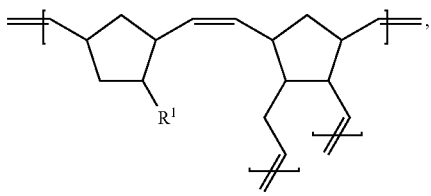

or a moiety represented by

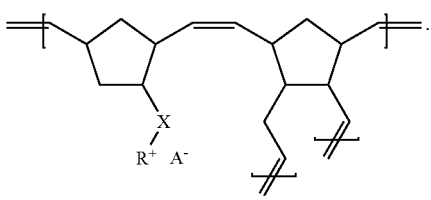

According to embodiments of the disclosure, the ratio between the third repeat unit and the sum of the first repeat unit and the second repeat unit can be between about 0.1:100 and 5:100, such as between about 0.5:100 and 4:100, or between about 0.5:100 and 3:100. Due to the introduction of the third repeat unit, the polymer can have improved cross-linking degree and mechanical strength by adopting the third repeat unit. In addition, when the ratio between the third repeat unit and the sum of the first repeat unit and the second repeat unit is too high, the polymer would have too high a cross-linking degree and too high a molecular weight and cannot be redissolved in the subsequent process solvent.

According to embodiments of the disclosure, the disclosure provides a method for preparing the aforementioned polymer. The method includes subjecting a composition to a polymerization, such as a ring opening metathesis polymerization (ROMP). The composition can include a first monomer having a structure of Formula (I) and a second monomer having a structure of Formula (II)

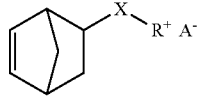

Formula (I)

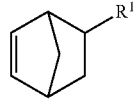

Formula (II)

wherein, $R^+$ can be

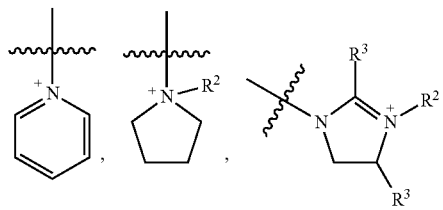

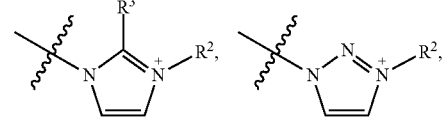

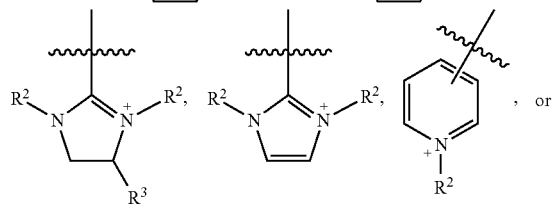

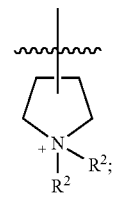

$A^-$ can be $F^-$, $Cl^-$, $Br^-$, $I^-$, $OH^-$, $HCO_3^-$, $HSO_4^-$, $SbF_6^-$, $H_2PO_4^-$, $H_2PO_3^-$, or $H_2PO_2^-$; X can be

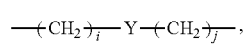

i and j can be independently 0, or an integer from 1 to 6, Y can be —O—, —S—, —CH$_2$—, or —NH—; R$^1$ can be independently C$_{1-8}$ alkyl group; and, R$^2$ and R$^3$ can be independently hydrogen, or C$_{1-8}$ alkyl group. In addition, a catalyst (such as the first generation or second generation Grubb's catalysts) can be further employed during the polymerization.

According to embodiments of the disclosure, the first monomer can be

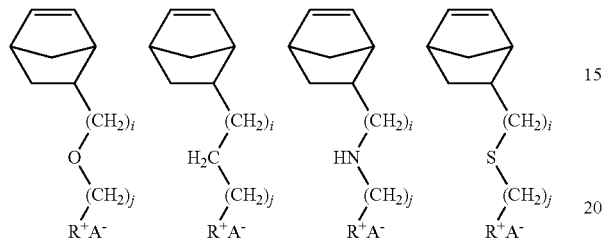

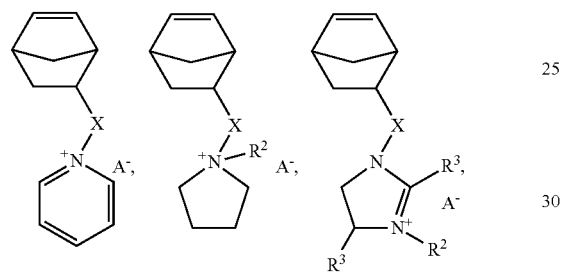

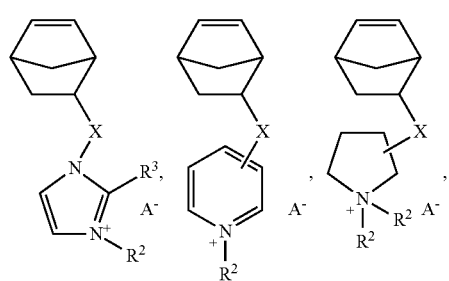

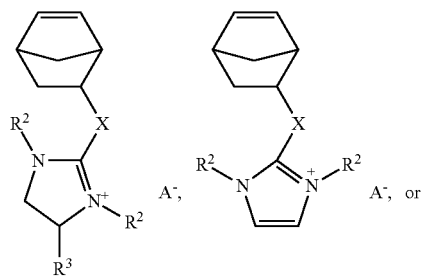

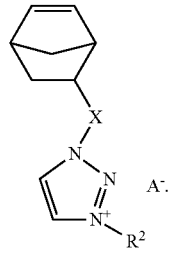

wherein, R$^+$ can be

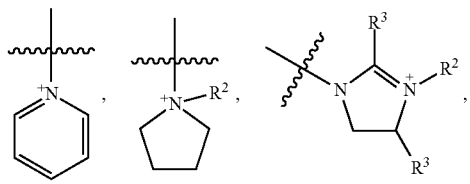

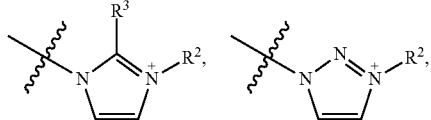

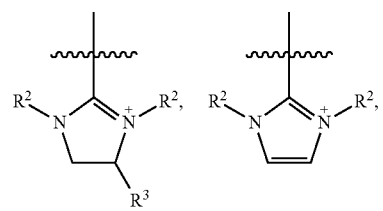

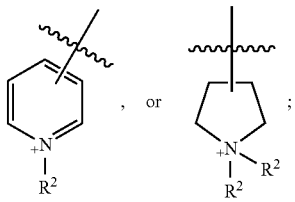

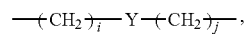

A$^-$ can be F$^-$, Cl$^-$, Br$^-$, I$^-$, OH$^-$, HCO$_3^-$, HSO$_4^-$, SbF$_6^-$, BF$_4^-$, H$_2$PO$_4^-$, H$_2$PO$_3^-$, or H$_2$PO$_2^-$; X can be $$-\!\!\!-(CH_2)_{\overline{i}}-Y-(CH_2)_{\overline{j}}-,$$

i and j can be independently 0, or an integer from 1 to 6, Y is —O—, —S—, —CH$_2$—, or —NH—; and, R$^2$ and R$^3$ are independently hydrogen, or C$_{1-8}$ alkyl group (such as: methyl, ethyl, propyl, isopropyl, n-butyl, sec-butyl, isobutyl, tert-butyl, pentyl, hexyl, cyclohexyl, cyclopentyl, heptyl, or octyl). In addition, the second monomer can be

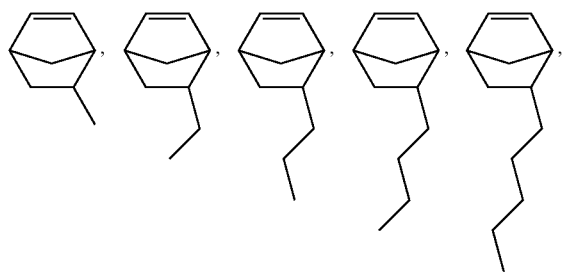

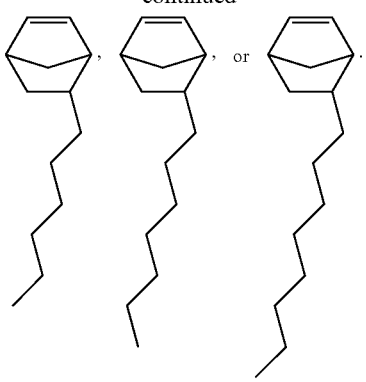

According to embodiments of the disclosure, the molar ratio between the first monomer and the second monomer can be between about 1:99 and 99:1, such as between about 10:90 and 90:10, between about 20:80 and 80:20, or between about 30:70 and 70:30.

In addition, according to embodiments of the disclosure, the composition can further include a third monomer, wherein the third monomer can be

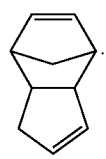

The molar ratio between the third monomer and the sum of the first monomer and the second monomer can be between about 0.1:100 and 5:100, such as between about 0.5:100 and 4:100, or between about 0.5:100 and 3:100.

According to embodiments of the disclosure, the polymer of the disclosure can be used to prepare an ion exchange membrane. The method for preparing the ion exchange membrane includes the following steps. First, a composition is provided, wherein the composition includes the aforementioned polymer and a cross-linking agent. In addition, the composition can further include a solvent, and the composition has a solid content between about 5 wt % and 50 wt %. In the composition, the cross-linking agent can has a weight percentage between about 1 wt % and 30 wt % (such as between about 5 wt % and 30 wt %, or between about 5 wt % and 25 wt %), based on the weight of the polymer. Next, the composition is subjected to a mixing and distributing process. Next, the composition is coated on a substrate (such as a glass substrate) to form a coating. Next, the coating is baked to remove most of the solvent. Next, the coating formed on the substrate is baked in a high temperature oven to remove residual solvent. Finally, the coating is immersed in potassium hydroxide aqueous solution and deionized water for 1-3 hours sequentially. After drying, the ion exchange membrane of the disclosure is obtained.

The cross-linking agent can be a compound having at least two maleimide groups. For example, the cross-linking agent can be a compound having two maleimide groups. According to embodiments of the disclosure, the compound having two maleimide groups can be

wherein Z can be

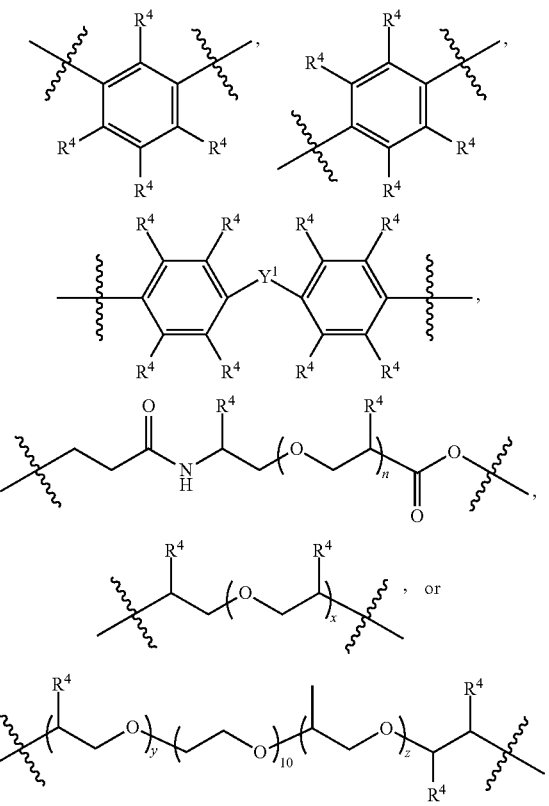

wherein $Y^1$ can be single bond, —O—, —S—, —CH$_2$—, or —NH—, $R^4$ can be independently hydrogen, or $C_{1-4}$ alkyl group; n≥1; x can be an integer from 1 to 12, y and z can be independently an integer from 1 to 5. For example, the cross-linking agent can be

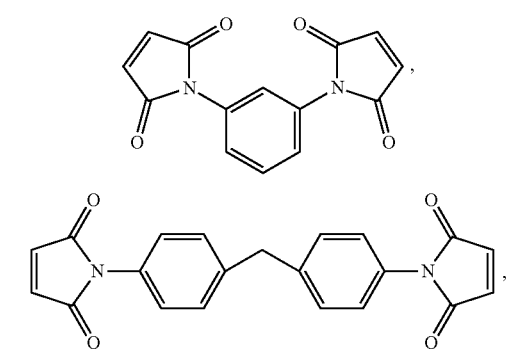

-continued

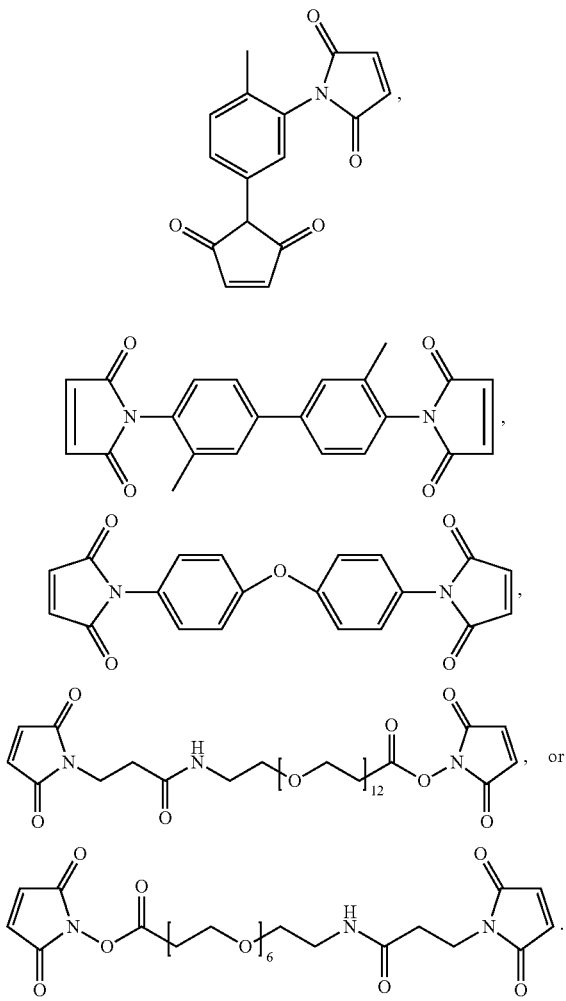

In addition, according to embodiments of the disclosure, the cross-linking agent can be a polymeric cross-linking agent having at least two maleimide groups. The polymeric cross-linking agent can be a reaction product of a compound (a) and a compound (b). The compound (a) can be

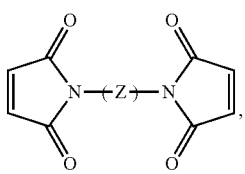

wherein Z can be

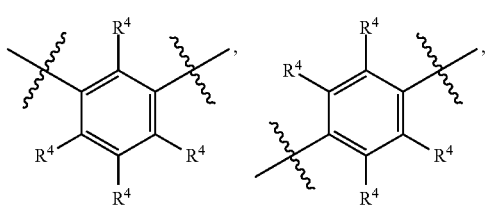

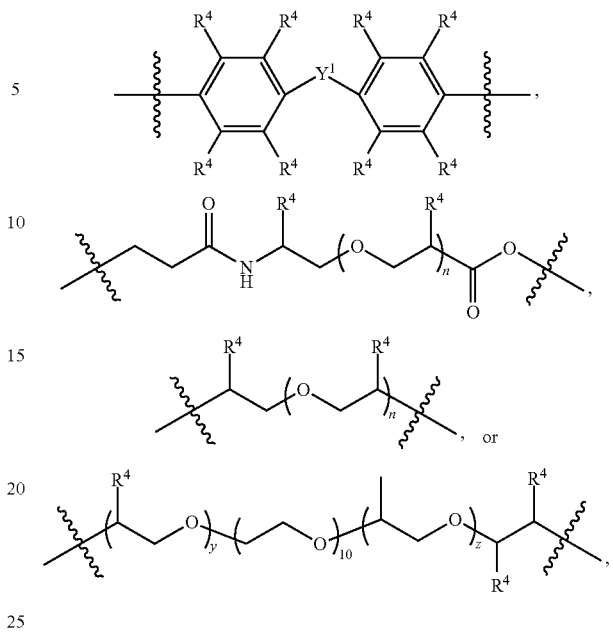

wherein $Y^1$ can be single bond, —O—, —S—, —CH$_2$—, or —NH—, $R^4$ can be independently hydrogen, or C$_{1-4}$ alkyl group; and, n≥1; x can be an integer from 1 to 12; and, y and z can be independently an integer from 1 to 5. The compound (b) can be a compound represented by Formula (III) or Formula (IV)

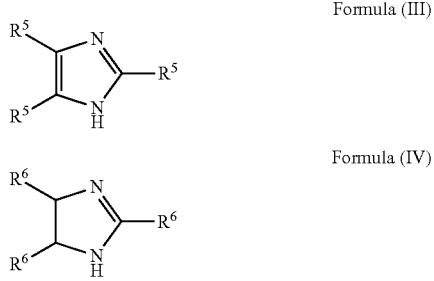

Formula (III)

Formula (IV)

wherein $R^5$ is independently hydrogen, or C$_{1-4}$ alkyl group; and, $R^6$ is independently hydrogen, or C$_{1-4}$ alkyl group. For example, the compound (b) can be

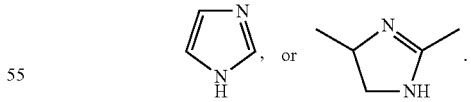

The polymeric cross-linking agent and the polymer can form an interpenetrating polymer network, thereby enhancing the mechanical strength and dimensional stability.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Preparation of Monomer with Cationic Group

Preparation Example 1

10 ml of dicyclopentadiene (0.074 mmol) and 20.15 ml of 1-allylimidazole (0.186 mmol) were added into a high-pressure reactor. After stirring at 180° C. for 8 hours, the result was purified by fractionation and column chromatography (using ethyl acetate (EA) and hexane (9:1) as the eluent), obtaining Compound (1) (colorless transparent viscous liquid). The synthesis pathway of the above reaction was as follows:

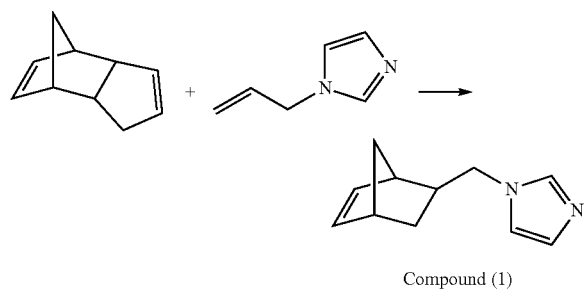

Compound (1)

Compound (1) was analyzed by nuclear magnetic resonance (NMR) spectroscopy and the result is as follows: $^1$H NMR (300 MHz, CDCl$_3$): δ 7.46 (d, J=15.3, 1H), 6.98 (m, 2H), 6.12 (m, 2H), 3.79 (m, 2H), 2.66 (m, 3H), 1.89 (m, 1H), 1.33 (m, 2H), 0.62 (m, 1H).

Next, 0.5 g of Compound (1) (2.87 mmol) and 0.268 ml of methyl iodide (4.30 mmol) were added into a reaction bottle. After stirring at room temperature (about 25° C.) for 8 hours and then removing residual methyl iodide by vacuum distillation, Compound (2) (yellow viscous liquid) was obtained. The synthesis pathway of the above reaction was as follows:

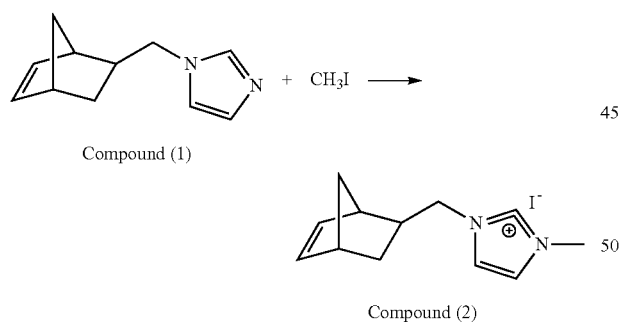

Compound (2)

Compound (2) was analyzed by nuclear magnetic resonance (NMR) spectroscopy and the result is as follows: $^1$H NMR (300 MHz, CDCl$_3$): δ 10.03 (d, J=12.0 Hz, 1H), 7.42 (m, 2H), 6.21 (m, 2H), 4.19 (m, 5H), 2.74 (m, 3H), 1.99 (m, 1H), 1.41 (m, 2H), 0.67 (m, 1H)

Preparation Example 2

15 ml of dimethylformamide (DMF) was added into a reaction bottle. Next, 1.7 g of sodium hydride (NaH) (0.00427 mol) was added into the reaction bottle at 0° C. Next, 2.122 g of 5-Norbomene-2-methanol (0.0171 mol) was added into the reaction bottle at 0° C. After stirring, 2 g of 1-methyl-2-(chloromethyl) imidazole (0.0154 mol) was added into the reaction bottle. After stirring for 12 hours, water was added into the reaction bottle to quench the reaction, and then the result was extracted by dichloromethane. After concentration, the result was purified by fractionation, obtaining Compound (3). The synthesis pathway of the above reaction was as follows:

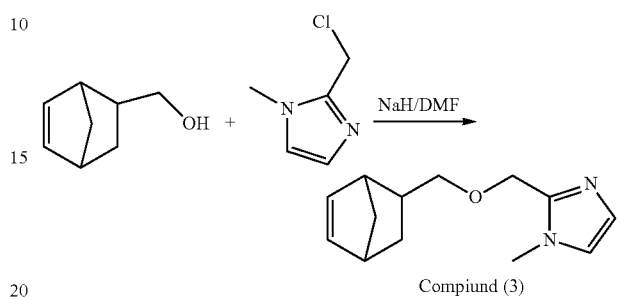

Compiund (3)

Compound (3) was analyzed by nuclear magnetic resonance (NMR) spectroscopy and the result is as follows: $^1$H NMR (300 MHz, CDCl$_3$): δ 6.90 (s, 2H), 6.10-5.76 (m, 2H), 4.59-4.81 (m, 2H), 3.71 (s, 3H), 3.51-3.00 (m, 2H), 2.86-2.69 (m, 2H), 2.33 (m, 1H), 1.84-1.66 (m, 1H), 1.41-1.10 (m, 2H), 0.47-0.43 (m, 1H)

Next, 2 g of Compound (3) (9 mmol) was added into a reaction bottle and dissolved in dichloromethane. Next, 1 ml of methyl iodide (17 mmol) was added into the reaction bottle. After stirring at room temperature for 12 hours, residual methyl iodide and solvent were removed, obtaining Compound (4) (yellow viscous liquid). The synthesis pathway of the above reaction was as follows:

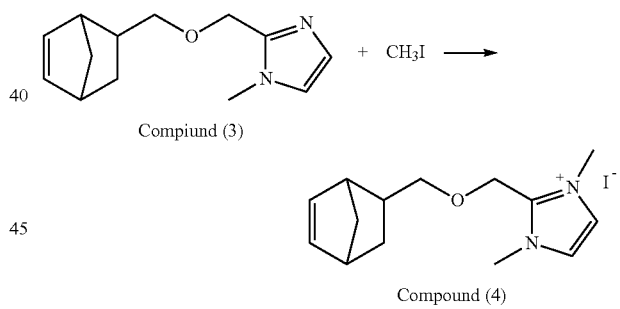

Compound (4)

Compound (4) was analyzed by nuclear magnetic resonance (NMR) spectroscopy and the result is as follows: $^1$H NMR (300 MHz, CDCl$_3$): δ 7.45 (s, 2H), 6.18-5.84 (m, 2H), 4.90 (s, 2H), 3.98 (s, 6H), 3.68-3.20 (m, 2H), 2.35 (m, 1H), 1.86-1.78 (m, 1H), 1.46-1.14 (m, 4H), 0.52-0.51 (m, 1H)

Preparation of Monomer with Non-Ionic Group

Preparation Example 3

13.4 ml of dicyclopentadiene (0.1 mmol) and 36 ml of 1-octene (0.23 mmol) were added into a high-pressure reactor. After stirring at 240° C. for 12 hours, the result was filtered through neutral alumina to remove the yellow suspension. Next, the result was purified by fractionation, obtaining Compound (5) (colorless transparent viscous liquid). The synthesis pathway of the above reaction was as follows:

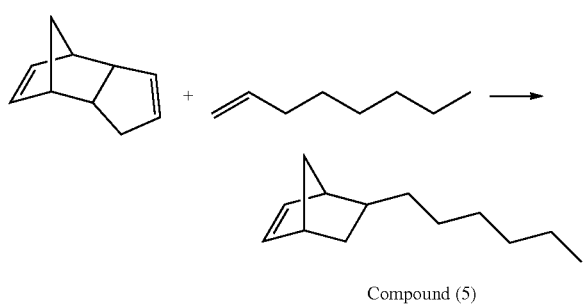

Compound (5)

Compound (5) was analyzed by nuclear magnetic resonance (NMR) spectroscopy and the result is as follows: $^1$H NMR (300 MHz, CDCl$_3$): δ 6.08 (m, 1H, endo), 6.04 (m, 1H, exo), 5.90 (m, 1H, endo), 2.67-2.77 (m, 2H), 2.48 (m, 1H, exo), 1.97 (m, 1H, endo), 1.80 (m, 1H, endo), 1.14-1.38 (m, 11H), 0.82-0.90 (m, 3H), 0.43-0.50 (m, 1H, endo)

Preparation of Cross-Linking Agent

Preparation Example 4

2.73 g of

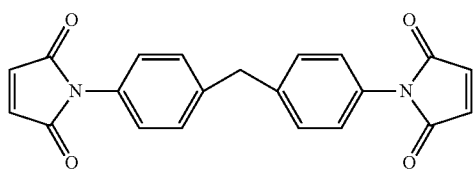 [SMILES: O=C1C=CC(=O)N1c1ccc(Cc2ccc(N3C(=O)C=CC3=O)cc2)cc1]

and 0.37 g of

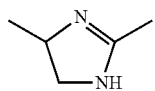

were added into a reaction bottle, wherein the molar ratio of the

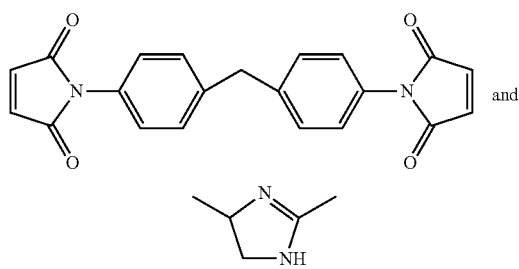 and was 2:1). Next, 97 g of dimethylacetamide (DMAc) was added into the reaction bottle. After stirring at 100-150° C. for 5-10 hours, Polymeric cross-linking agent (1) was obtained.

Preparation of Polymer

Example 1

3.08 g of Compound (2) (9.74 mmole) and 0.19 g of Compound (5) (1.08 mmole) were added into a reaction bottle under a nitrogen atmosphere, wherein the molar ratio of Compound (2) and Compound (5) was about 9:1. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (1) (having a repeat unit represented by

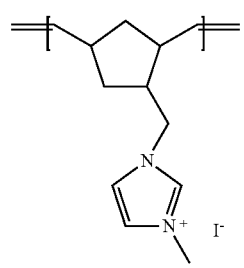

and a repeat unit represented by

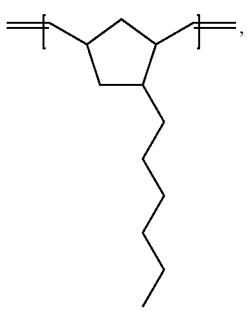

wherein the ratio of the repeat unit represented by

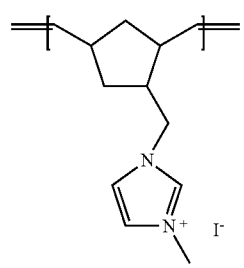

and the repeat unit represented by

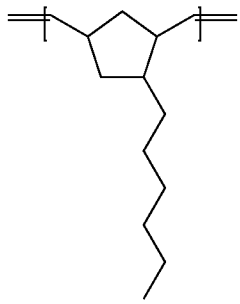

was about 9:1) was obtained. After measurement, the number average molecular weight (Mn) of Polymer (1) is about 110,000, and the polydispersity index (PDI) of Polymer (1) is about 1.4.

Example 2

Example 2 was performed in the same manner as in Example 1 except that the molar ratio of Compound (2) and Compound (5) was about 8:2, obtaining Polymer (2) (the ratio of the repeat unit represented by

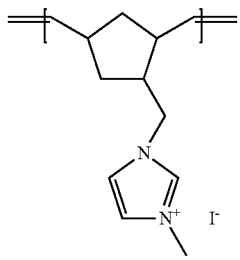

and the repeat unit represented by

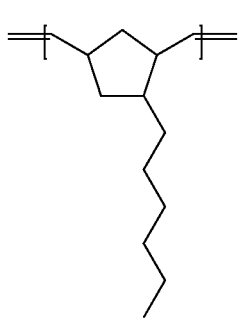

was about 8:2).

Example 3

Example 3 was performed in the same manner as in Example 1 except that the molar ratio of Compound (2) and Compound (5) was about 7:3, obtaining Polymer (3) (the ratio of the repeat unit represented by

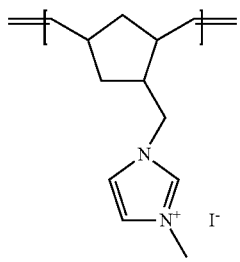

and the repeat unit represented by

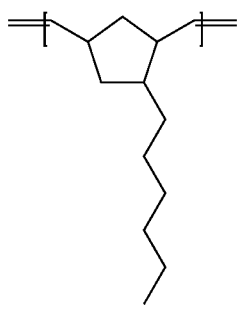

was about 7:3).

Example 4

Example 4 was performed in the same manner as in Example 1 except that the molar ratio of Compound (2) and Compound (5) was about 4:6, obtaining Polymer (4) (the ratio of the repeat unit represented by

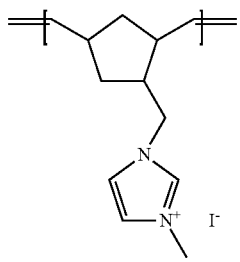

and the repeat unit represented by

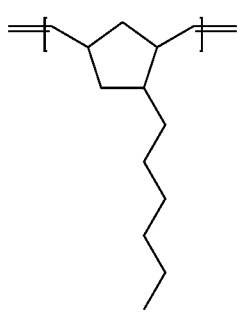

was about 4:6).

Example 5

Example 5 was performed in the same manner as in Example 1 except that the molar ratio of Compound (2) and Compound (5) was about 2:8, obtaining Polymer (5) (the ratio of the repeat unit represented by

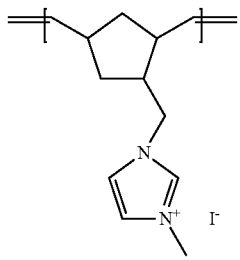

and the repeat unit represented by

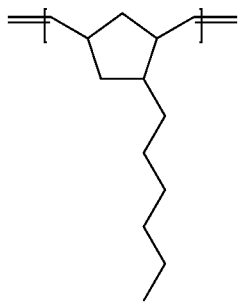

was about 2:8).

Example 6

3.53 g of Compound (4) (9.74 mmole) and 0.19 g of Compound (5) (1.08 mmole) were added into a reaction bottle under a nitrogen atmosphere, wherein the molar ratio of Compound (4) and Compound (5) was about 9:1. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (6) (having a repeat unit represented by

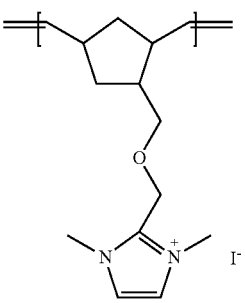

and a repeat unit represented by

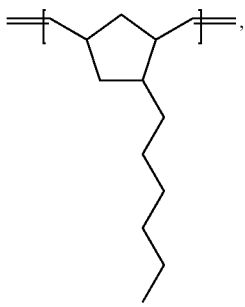

wherein the ratio of the repeat unit represented by

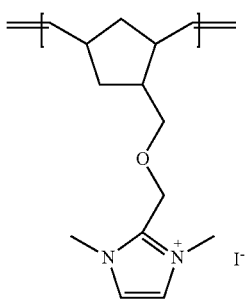

and the repeat unit represented by

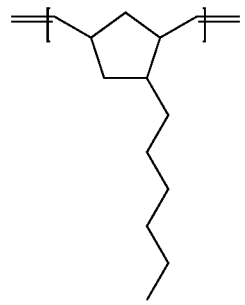

was about 9:1) was obtained.

Example 7

Example 7 was performed in the same manner as in Example 6 except that the molar ratio of Compound (4) and Compound (5) was about 6:4, obtaining Polymer (7) (the ratio of the repeat unit represented by

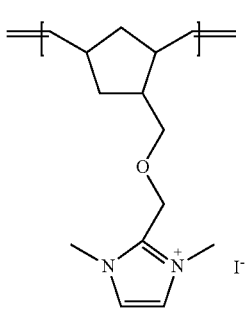

and the repeat unit represented by

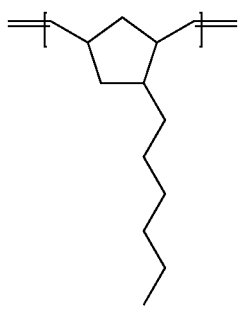

was about 6:4).

Example 8

Example 8 was performed in the same manner as in Example 6 except that the molar ratio of Compound (4) and Compound (5) was about 3:7, obtaining Polymer (8) (the ratio of the repeat unit represented by

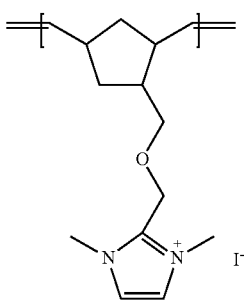

and the repeat unit represented by

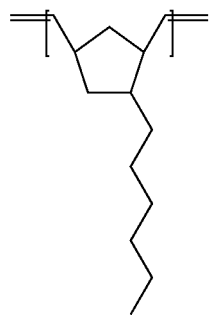

was about 3:7).

Example 9

3.08 g of Compound (2) (9.74 mmole), 0.19 g of Compound (5) (1.08 mmole), and 12 mg of dicyclopentadiene (0.097 mmole) were added into a reaction bottle under a nitrogen atmosphere, wherein the molar ratio of Compound (2), Compound (5), and dicyclopentadiene was about 9:1: 0.09. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (9) (having a repeat unit represented by

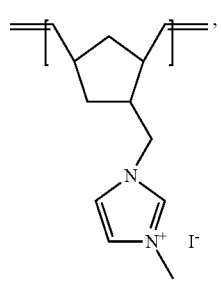

a repeat unit represented by

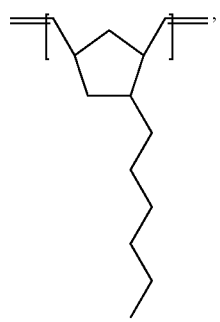

and a repeat unit represented by

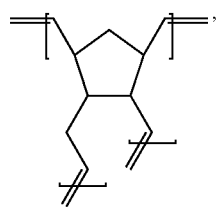

wherein the ratio of the repeat unit represented by

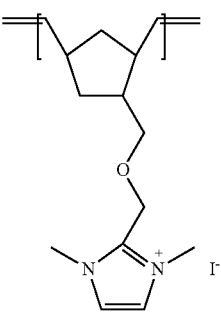

the repeat unit represented by

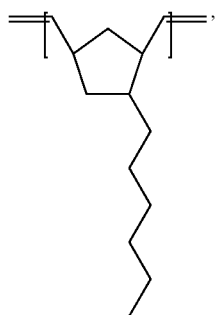

and the repeat unit represented by

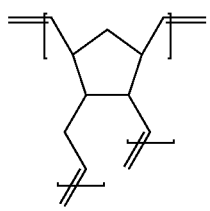

was about 9:1:0.09) was obtained.

Preparation of Anion Exchange Membrane

Example 10

100 parts by weight of polymer (1) (prepared from Example 1) was added into a reaction bottle, and dissolved in 667 parts by weight of dimethylacetamide (DMAc). Next, 10 parts by weight of polymeric cross-linking agent (1) (prepared from Preparation Example 4) was added into the reaction bottle. Next, the result was mixed and distributed via a high speed homogenizer, and then defoamed, obtaining a solution. Next, the solution was coated on a glass substrate via spin coating, forming a coating. Next, the coating was baked at 40-150° C. to remove most of the solvent. Next, the coating was baked at 120-200° C. for 1-6 hours to remove residual solvent. Next, the coating was immersed in potassium hydroxide aqueous solution at room temperature for 1.5 hours and deionized water at room temperature for 1.5 hours sequentially to ensure no solvent remained in the coating. After drying, Anion exchange membrane (1) was obtained. Next, the ionic conductivity of Anion exchange membrane (1) was measured, and the result is shown in Table 1.

Example 11-14

Examples 11-14 were performed in the same manner as in Example 10 except that Polymers (2)-(5) were substituted for Polymer (1) respectively, obtaining Anion exchange membranes (2)-(5). Next, the ionic conductivity of Anion exchange membranes (2)-(5) were measured, and the results are shown in Table 1. Furthermore, the tensile strength and anti-rupture strength of Anion exchange membrane (3) were measured according to ASTM D882-02, and the result is shown in Table 2.

TABLE 1

| | ratio of the repeat unit represented by and the repeat unit represented by | ionic conductivity (S/cm) |
|---|---|---|
| Anion exchange membrane (1) | 9:1 | 0.13 |
| Anion exchange membrane (2) | 8:2 | — |
| Anion exchange membrane (3) | 7:3 | 0.06 |
| Anion exchange membrane (4) | 4:6 | 0.05 |
| Anion exchange membrane (5) | 2:8 | 0.005 |

As shown in Table 1, with the increase of the ratio of the repeat unit represented by

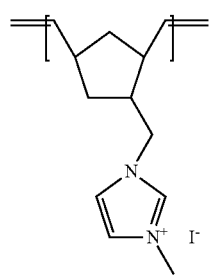

and the repeat unit represented by

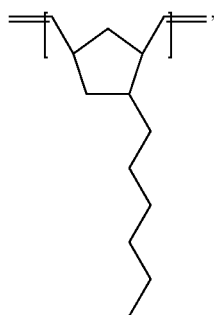

the ionic conductivity of the anion exchange membrane is improved.

Example 15

Example 15 was performed in the same manner as in Example 12 except that 7 parts by weight of Polymeric cross-linking agent (1) was substituted for 10 parts by weight of Polymeric cross-linking agent (1), obtaining Anion exchange membrane (6). Next, the tensile strength and anti-rupture strength of Anion exchange membrane (6) were measured according to ASTM D882-02, and the result is shown in Table 2.

Example 16

Example 16 was performed in the same manner as in Example 12 except that 20 parts by weight of Polymeric cross-linking agent (1) was substituted for 10 parts by weight of Polymeric cross-linking agent (1), obtaining Anion exchange membrane (7). Next, the tensile strength and anti-rupture strength of Anion exchange membrane (7) were measured according to ASTM D882-02, and the result is shown in Table 2.

Example 17

Example 17 was performed in the same manner as in Example 12 except that 25 parts by weight of Polymeric cross-linking agent (1) was substituted for 10 parts by weight of Polymeric cross-linking agent (1), obtaining Anion exchange membrane (8). Next, the tensile strength and anti-rupture strength of Anion exchange membrane (8) were measured according to ASTM D882-02, and the result is shown in Table 2.

TABLE 2

|  | polymeric cross-linking agent (parts by weight) | tensile strength (MPa) | anti-rupture strength (MPa) |
| --- | --- | --- | --- |
| Anion exchange membrane (3) | 10 | 25.59 | 36.57 |
| Anion exchange membrane (6) | 7 | 32.51 | 44.35 |
| Anion exchange membrane (7) | 20 | 30.19 | 45.77 |
| Anion exchange membrane (8) | 25 | 35.22 | 47.32 |

As shown in Table 2, with the increase of the concentration of the polymeric cross-linking agent, the mechanical strength (such as tensile strength and anti-rupture strength) is improved. Therefore, according to Tables 1 and 2, the anion exchange membrane of the disclosure exhibits superior ionic conductivity and mechanical strength.

Example 18

100 parts by weight of polymer (6) (prepared from Example 6) was added into a reaction bottle, and dissolved in 667 parts by weight of dimethylacetamide (DMAc). Next, 10 parts by weight of Polymeric cross-linking agent (1) (prepared from Preparation Example 4) was added into the reaction bottle. Next, the result was mixed and distributed via a high speed homogenizer, and then defoamed, obtaining a solution. Next, the solution was coated on a glass substrate via spin coating, forming a coating. Next, the coating was baked at 40-150° C. to remove most of the solvent. Next, the coating was baked at 120-200° C. for 1-6 hours to remove residual solvent. Next, the coating was immersed in potassium hydroxide aqueous solution at room temperature for 1.5 hours and deionized water at room temperature for 1.5 hours sequentially to ensure no solvent remained in the coating. After drying, Anion exchange membrane (9) was obtained. Next, the ionic conductivity and dimensional stability of Anion exchange membrane (9) was measured, and the result is shown in Table 3.

Examples 19-20

Examples 19-20 were performed in the same manner as in Example 18 except that Polymers (7) and (8) were substituted for Polymer (6) respectively, obtaining Anion exchange membranes (10) and (11). Next, the ionic conductivity and dimensional stability of Anion exchange membranes (10) and (11) were measured, and the results are shown in Table 3.

TABLE 3

|  | ionic conductivity (S/cm) | dimensional shrinkage (%) (measured at 25° C.) | | dimensional shrinkage (%) (measured at 80° C.) | |
| --- | --- | --- | --- | --- | --- |
|  |  | area | thickness | area | thickness |
| anion exchange membrane (9) | 0.09 | 20 | 9 | 24 | 31 |
| anion exchange membrane (10) | 0.02 | 0 | 13 | 0 | 4 |
| anion exchange membrane (11) | 0.004 | 15 | 6 | 4.5 | 21 |

As shown in Table 3, with the increase of the ratio of the repeat unit represented by

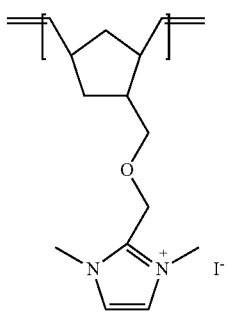

and the repeat unit represented by

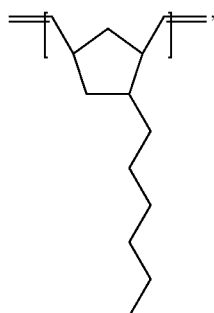

the ionic conductivity of the anion exchange membrane is improved. In addition, the anion exchange membrane of the disclosure also exhibits high dimensional stability.

Accordingly, due to the introduction of stably cationic group, the polymer of the disclosure exhibits high ionic conductivity. Furthermore, due to the introduction of non-ionic group simultaneously, the polymer of the disclosure also exhibits high solubility, mechanical strength, and solvent selectivity.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A polymer, comprising a first repeat unit and a second repeat unit, wherein the first repeat unit is

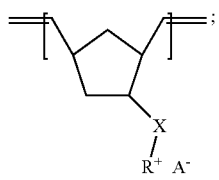

the second repeat unit is

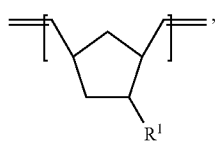

wherein R$^+$ is

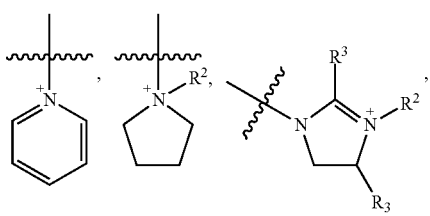

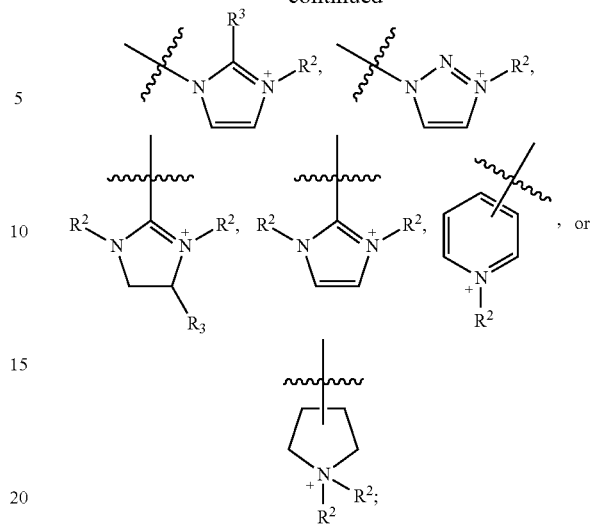

$A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is

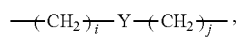

i and j is independently an integer from 1 to 6, Y is —O—, —S—, —CH$_2$—, or —NH—; R$^1$ is independently C$_{1-8}$ alkyl group; and, R$^2$ and R$^3$ are independently hydrogen, or C$_{1-8}$ alkyl group.

2. The polymer as claimed in claim 1, wherein the ratio between the first repeat unit and the second repeat unit is between 1:99 and 99:1.

3. The polymer as claimed in claim 1, wherein R$^1$ is methyl, ethyl, propyl, isopropyl, n-butyl, sec-butyl, isobutyl, tert-butyl, pentyl, hexyl, cyclohexyl, cyclopentyl, heptyl, or octyl.

4. The polymer as claimed in claim 1, wherein R$^2$ and R$^3$ are independently hydrogen, methyl, ethyl, propyl, isopropyl, n-butyl, sec-butyl, isobutyl, tert-butyl, pentyl, hexyl, cyclohexyl, cyclopentyl, heptyl, or octyl.

5. The polymer as claimed in claim 1, wherein the first repeat unit is

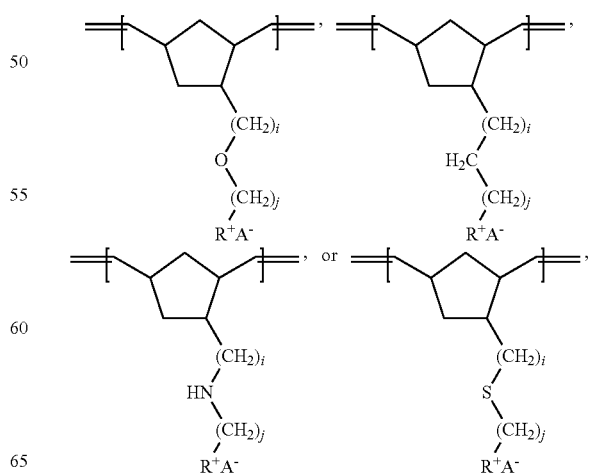

wherein R⁺ is

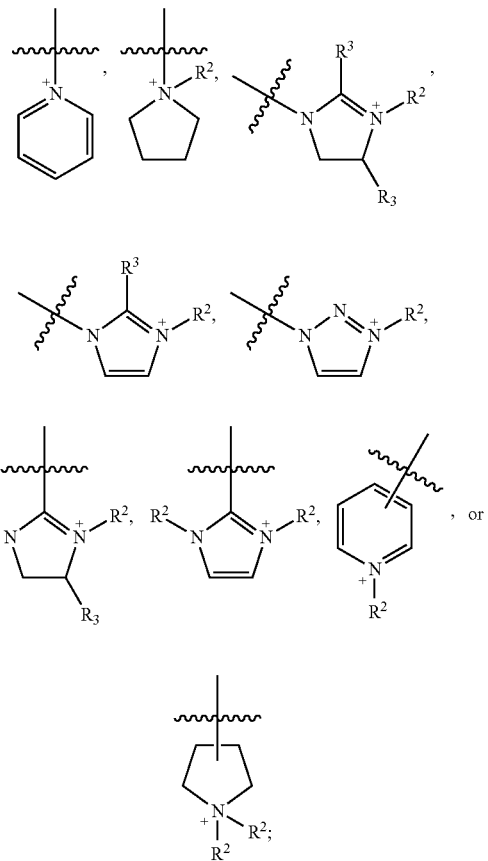

A⁻ is F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂⁻; i and j is independently an integer from 1 to 6; and, $R^2$ and $R^3$ are independently hydrogen, or $C_{1-8}$ alkyl group.

6. The polymer as claimed in claim 1, wherein the first repeat unit is

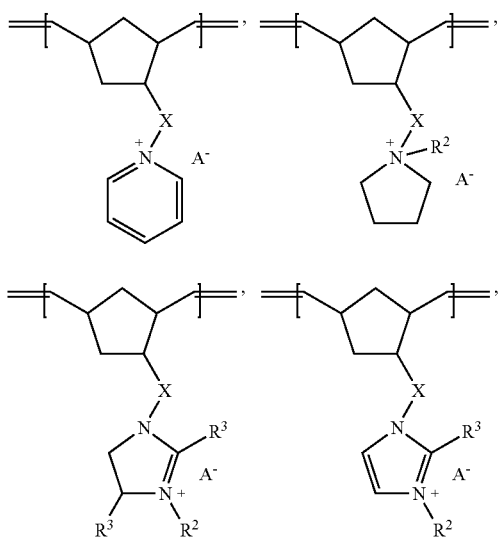

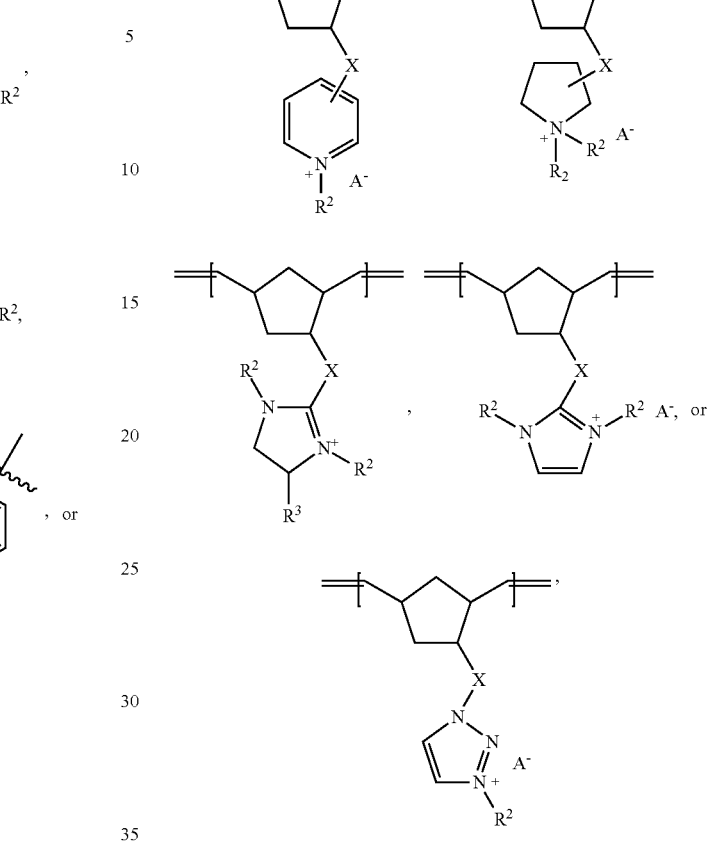

wherein A⁻ is F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂⁻; X is

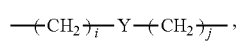

i and j is independently an integer from 1 to 6, Y is —O—, —S—, —CH₂—, or —NH—; and, $R^2$ and $R^3$ are independently hydrogen, or $C_{1-8}$ alkyl group.

7. The polymer as claimed in claim 1, wherein the second repeat unit is

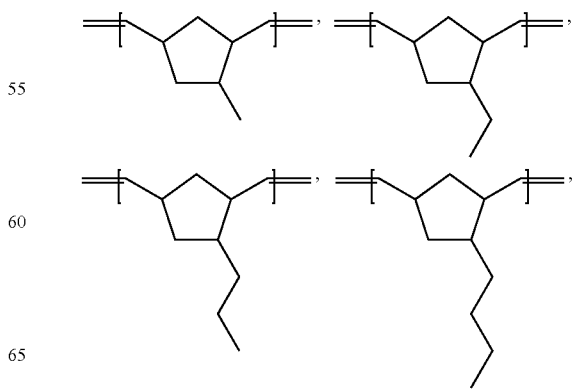

-continued

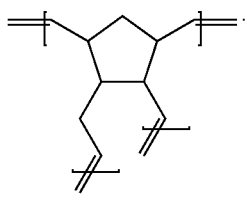

8. The polymer as claimed in claim 1, wherein the polymer further comprising a third repeat unit, wherein the third repeat unit is

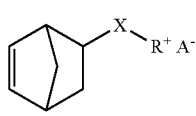

9. The polymer as claimed in claim 8, wherein the ratio between the third repeat unit and the sum of the first repeat unit and the second repeat unit is between 0.1:100 and 5:100.

10. A method for preparing the polymer as claimed in claim 1, comprising:

subjecting a composition to a polymerization, wherein the composition comprises a first monomer having a structure of Formula (I), and a second monomer having a structure of Formula (II)

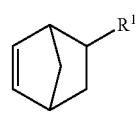 Formula (I)

Formula (II)

wherein $R^+$ is

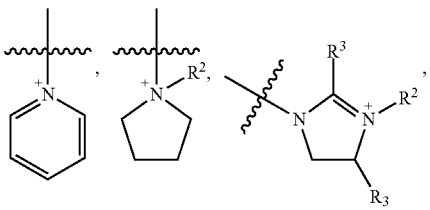

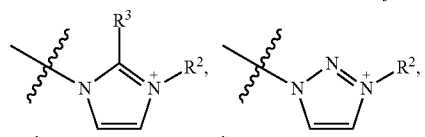

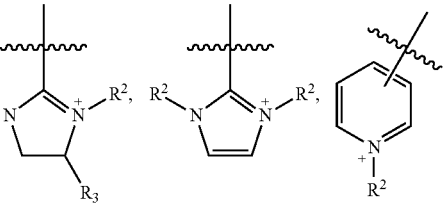

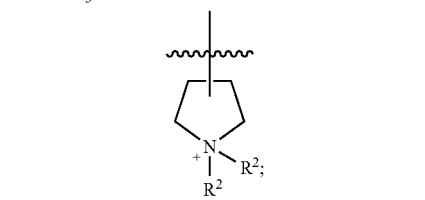

$A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is $$-(CH_2)_i-Y-(CH_2)_j-,$$

i and j is independently an integer from 1 to 6, Y is —O—, —S—, —CH$_2$—, or —NH—; $R^1$ is independently $C_{1-8}$ alkyl group; and, $R^2$ and $R^3$ are independently hydrogen, or $C_{1-8}$ alkyl group.

11. The method as claimed in claim 10, wherein the molar ratio between the first monomer and the second monomer is between 1:99 and 99:1.

12. The method as claimed in claim 10, wherein $R^1$ is methyl, ethyl, propyl, isopropyl, n-butyl, sec-butyl, isobutyl, tert-butyl, pentyl, hexyl, cyclohexyl, cyclopentyl, heptyl, or octyl.

13. The method as claimed in claim 10, wherein $R^2$ and $R^3$ are independently hydrogen, methyl, ethyl, propyl, isopropyl, n-butyl, sec-butyl, isobutyl, tert-butyl, pentyl, hexyl, cyclohexyl, cyclopentyl, heptyl, or octyl.

14. The method as claimed in claim 10, wherein the first monomer is

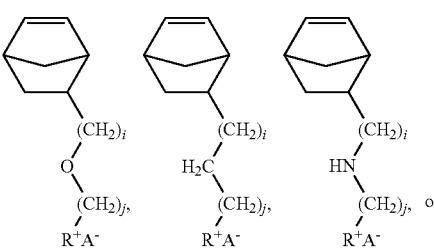

-continued

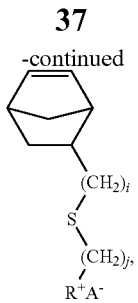

wherein R⁺ is

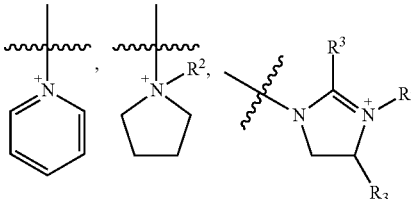

A⁻ is F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂⁻; i and j is independently an integer from 1 to 6; and, $R^2$ and $R^3$ are independently hydrogen, or $C_{1-8}$ alkyl group.

15. The method as claimed in claim 10, wherein the first monomer is

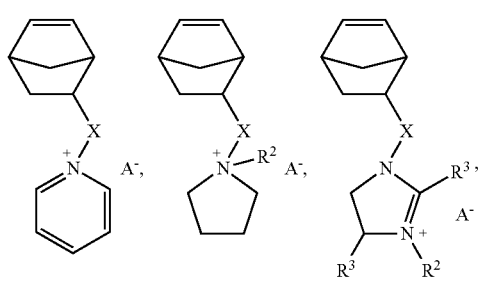

-continued

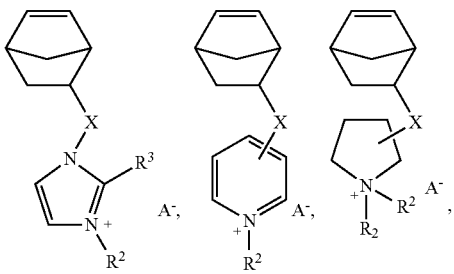

wherein A⁻ is F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂⁻; X is $$-\!(CH_2)_{\overline{i}}\!-\!Y\!-\!(CH_2)_{\overline{j}}\!-,$$

i and j is independently an integer from 1 to 6, Y is —O—, —S—, —CH₂—, or —NH—; and, $R^2$ and $R^3$ are independently hydrogen, or $C_{1-8}$ alkyl group.

16. The method as claimed in claim 10, wherein the second monomer is

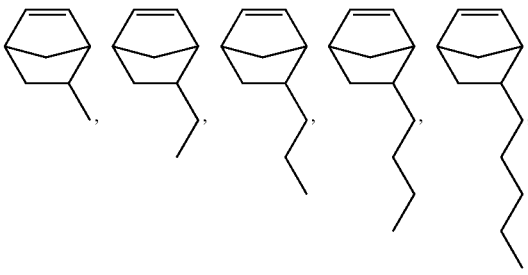

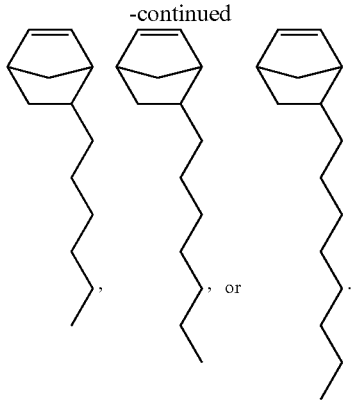
17. The method as claimed in claim 10, wherein the composition further comprises a third monomer, wherein the third monomer is
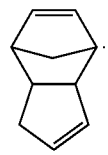
18. The method as claimed in claim 17, wherein the molar ratio between the third monomer and the sum of the first monomer and the second monomer is between 0.1:100 and 5:100.
* * * * *